United States Patent [19]

Merritt, III et al.

[11] Patent Number: 5,014,613
[45] Date of Patent: May 14, 1991

[54] TWINE WRAPPER TRIP MECHANISM

[75] Inventors: John H. Merritt, III, New Holland; Edwin O. Margerum, Paradise, both of Pa.

[73] Assignee: Ford New Holland, Inc., New Holland, Pa.

[21] Appl. No.: 559,780

[22] Filed: Jul. 30, 1990

[51] Int. Cl.$^5$ .................. B65B 63/04; B65B 13/20
[52] U.S. Cl. .................................. 100/5; 100/88; 56/341
[58] Field of Search ............... 100/4, 5, 87-89; 56/341-343

[56] References Cited

U.S. PATENT DOCUMENTS

| | | |
|---|---|---|
| 4,167,844 | 9/1979 | Freimuth et al. . |
| 4,246,743 | 1/1981 | Anstee et al. .................... 56/341 |
| 4,557,189 | 12/1985 | Schaible ............................ 100/5 |
| 4,658,573 | 4/1987 | Van Ginhoven ................ 56/341 |
| 4,771,595 | 9/1988 | Jennings . |
| 4,779,526 | 10/1988 | Frerich et al. .................... 100/5 |
| 4,798,044 | 1/1989 | Viaud et al. ...................... 56/341 |
| 4,885,990 | 12/1989 | Mouret . |
| 4,956,968 | 9/1990 | Underhill ........................... 56/341 |

FOREIGN PATENT DOCUMENTS 3418681 11/1985 Fed. Rep. of Germany ........ 100/89

Primary Examiner—Harvey C. Hornsby
Assistant Examiner—T. Soo Hoo
Attorney, Agent, or Firm—Darrell F. Marquette; Frank A. Seemar; Larry W. Miller

[57] ABSTRACT

A roll baling machine includes a main frame, a tailgate pivotally connected to the main frame, and an apron extending around a plurality of guide rolls disposed in the main frame and in the tailgate. A pair of take up arms are rotatably mounted in the tailgate and carry an additional guide roll for the apron. A pair of levers are connected to rotate with the take up arms, and springs are connected to the levers to urge the take up arms into a bale starting position. The machine is provided with a twine wrapper, and a mechanism for automatically tripping the twine wrapper into operation comprises a cam surface on one of the levers engageable with a cam roller carried on a first link. This first link is rotatably mounted on the main frame and is connected to a sliding member which is movable toward and away from a tripping position. The tripping mechanism also includes second, third and fourth links connecting the first link to the sliding member. When the tailgate is raised, the cam surface on the one lever is moved out of engagement with the cam roller on the first link to prevent improper tripping of the twine wrapper.

12 Claims, 4 Drawing Sheets

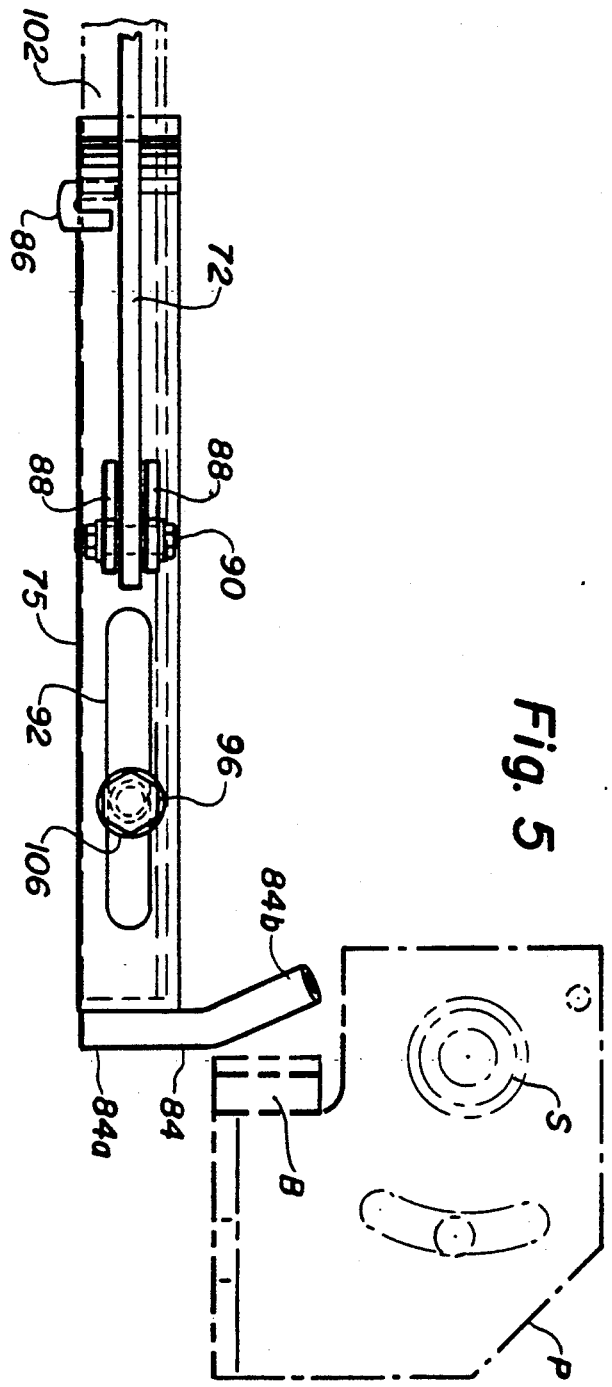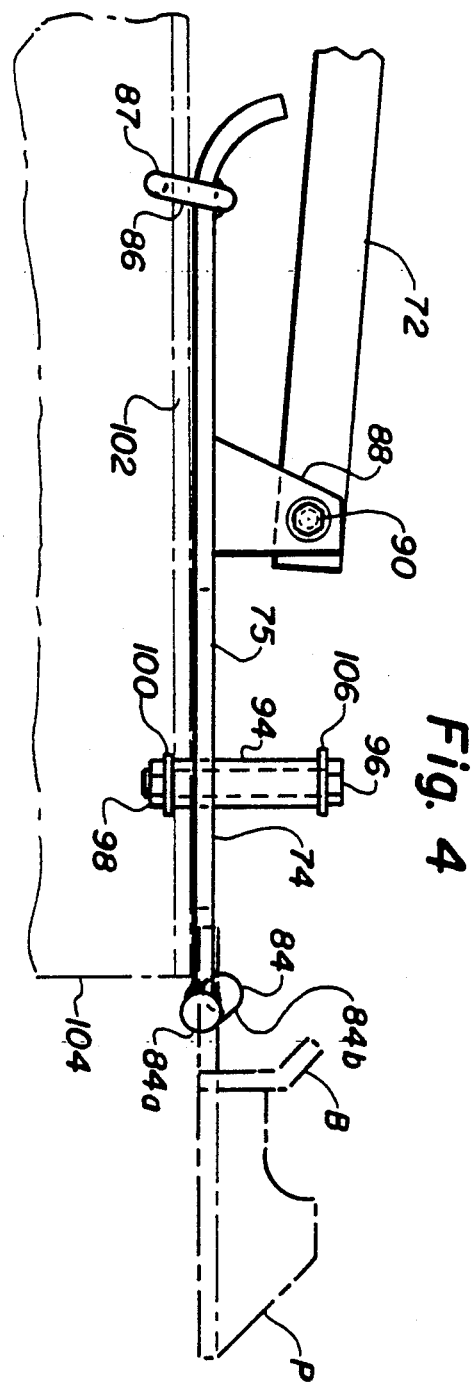

1

TWINE WRAPPER TRIP MECHANISM

BACKGROUND OF THE INVENTION

This invention relates generally to roll baling machines typically referred to as "round balers" which form cylindrical bales of crop material and, in particular, to a twine wrapper trip mechanism for such machines.

U.S. Pat. No. 4,771,595 to R. E. Jennings discloses a round baler having a plurality of rollers that cooperate with an apron consisting of a plurality of belts to form cylindrical bales. Take up arms for the apron are rotatably mounted in a tailgate of the baler. Consequently, the take up arms are lifted whenever the tailgate is raised. Mounting the take up arms in the tailgate causes a problem when a conventional type of automatic twine wrapper such as disclosed in U.S. Pat. No. 4,167,844 to J. H. Freimuth et al is installed on the baler of the Jennings patent. This type of twine wrapper is automatically tripped into operation by the apron take up arms as they rotate during bale formation. However, with the type of twine wrapper disclosed in the Freimuth et al patent installed on the baler disclosed in the Jennings patent, the apron take up arms will improperly trip the twine wrapper into operation whenever the tailgate is raised. Such improper tripping of the twine wrapper is undesirable.

SUMMARY OF THE INVENTION

The present invention provides a mechanism for automatically tripping a twine wrapper into operation on a roll baling machine which has a main frame, a tailgate pivotally connected to the main frame, and an apron extending around a plurality of guide members disposed in the main frame and the tailgate. A pair of take up arms are rotatably mounted in the tailgate and carry a further guide member for the apron. The take up arms have a bale starting position. A lever is connected to rotate with the take up arms, and spring means is connected to the lever for urging the take up arms into their bale starting position. The tripping mechanism comprises a cam surface on the lever engageable with a cam roller carried on a first link. The first link is rotatably mounted on the main frame and is connected to a sliding member which is movable toward and away from a tripping position.

DESCRIPTION OF THE DRAWINGS

FIG. 4 is an enlarged side elevation view of part of the twine wrapper trip mechanism shown in FIGS. 1, 2 and 3; and FIG. 5 is a top plan view of the part of the twine wrapper trip mechanism shown in FIG. 4.

DESCRIPTION OF THE PREFERRED EMBODIMENT

Figure 1:
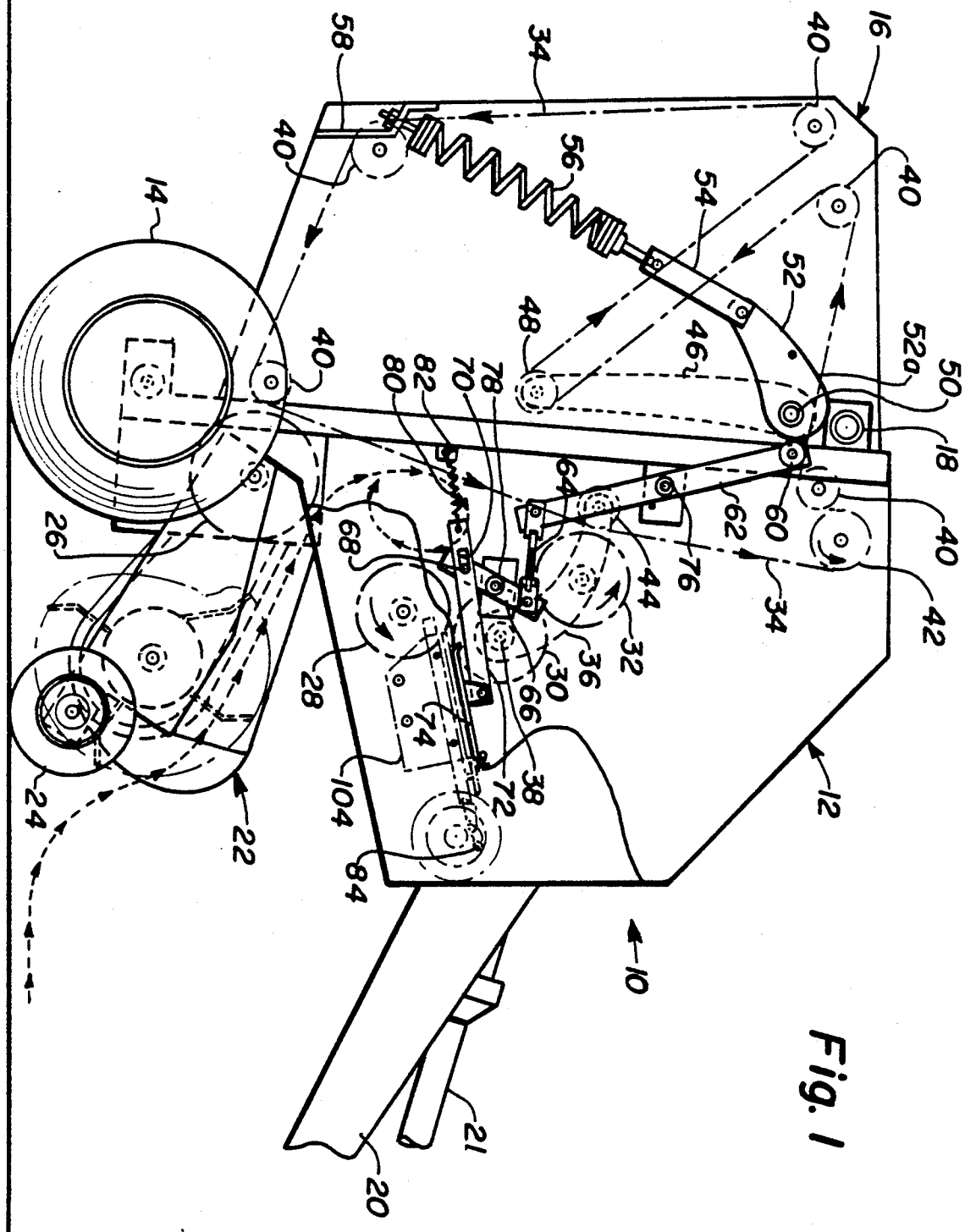
FIG. 1 is a side elevation view of a round baler incorporating the preferred embodiment of a twine wrapper trip mechanism according to the present invention taken at the start of bale formation.

Referring to FIG. 1, a round baler 10 includes a main frame 12 supported by a pair of wheels 14. A tailgate 16 is pivotally mounted on the main frame 12 by stub shafts 18, and a tongue 20 has one end fixedly attached to the main frame 12 while the other end of the tongue 20 is adapted for attachment to a tractor (not shown). A pickup device 22 is supported by a pair of wheels 24 for lifting crop material from the ground and moving it toward a floor roller 26. A series of rollers 28, 30, 32 cooperates with the floor roller 26 and with an apron 34 which consists of a plurality of belts arranged side-by-side to define an expandable bale forming chamber.

Rollers 28 and 30 are mounted in fixed positions adjacent each other but roller 32 is carried by a pair of sledge arms 36 which pivot on shaft 38 of roller 30. The apron 34 extends around guide rolls 40 and a drive roll 42. An additional guide roll 44 for the apron 34 is carried on the sledge arms 36, and a pair of take up arms 46 carry another guide roll 48 around which the apron 34 extends. The drive roll 42 is driven in a counterclockwise direction in FIG. 1 thereby causing an inner run of the apron 34 extending between the lowermost guide roll 40 and the drive roll 42 to travel upwardly and forwardly as a bale is being started in the bale forming chamber. Rollers 28, 30, 32 are also driven in a counterclockwise direction in FIG. 1 to assist the apron 34 during bale formation. Power for driving the rollers 28, 30, 32 and the drive roll 42 is supplied by a drive shaft 21 which is connected to a tractor PTO.

The take up arms 46 are fixed to a cross shaft 50 which is rotatably mounted in the tailgate 16. A pair of levers 52 are also fixed to the cross shaft 50 to rotate with the take up arms 46, and straps 54 are connected between the levers 52 and springs 56. The springs 56 are anchored to brackets 58 mounted in the tailgate 16. It will be understood that the springs 56 act to urge the take up arms 46 into a bale starting position shown in broken lines in FIG. 1 and to resist upward movement of the take up arms 46 away from their bale starting position. This action of the springs 56 maintains tension in the apron 34 during bale formation.

According to the present invention, one of the levers 52 has a cam surface 52a formed thereon which contacts a cam roller 60 carried on the upper end of a first link 62. The lower end of the first link 62 is pivotally connected to one end of a second link 64 while the other end of the second link 64 is pivotally connected to the upper end of a third link 66. A pin 68 carried on the lower end of the third link 66 is disposed in a slot 70 formed in one end of a fourth link 72. The other end of the fourth link 72 is pivotally connected to a sliding member 74 which activates a twine wrapper (not shown) on the round baler 10. This twine wrapper may be of the type disclosed in U.S. Pat. No. 4,167,844 to J. H. Freimuth et al, incorporated herein by reference. The links 62 and 66 are rotatably mounted on stub shafts 76 and 78, respectively, which are carried on the main frame 12, and a tension spring 80 is connected between the fourth link 72 and a bracket 82 on the main frame 12.

Referring to FIGS. 4 and 5, the sliding member 74 has a base 75 with a finger 84 at one end and a hook 86 adjacent the other end thereof. A pair of upstanding tabs 88 are fixed to the base 75 of sliding member 74 for receiving a bolt 90 which pivotally connects the link 72 and the sliding member 74. An elongated slot 92 in the base 75 of sliding member 74 receives a sleeve 94 through which a bolt 96 extends. A nut 98 and a lock washer 100 secure the bolt 96 to a flange portion 102 of a support bracket 104 on the main frame 12 of round baler 10. A flat washer 106 is disposed between the upper end of the sleeve 94 and the head of bolt 96.

A lower leg 87 of the hook 86 extends underneath the support bracket flange portion 102 to assist in guiding back and forth movement (i.e. left and right in FIGS. 4 and 5) of the sliding member 74 relative to the support bracket 104. The finger 84 has a straight portion 84*l* that is welded to the base 75 of sliding member 74 and an angled portion 84*b* that extends rearwardly and upwardly with respect to the straight portion 84*a*. The elongated slot 92 limits the back and forth movement of the sliding member 74 while the flat washer 106 limits upward tilting movement of the sliding member 74.

When the sliding member 74 is moved to the right in FIGS. 4 and 5 toward a tripping position, the angled portion 84*b* of finger 84 engages a bracket B on a plate P that is rotatably mounted on a shaft S. It should be understood that the plate P, which forms no part of the present invention, is designated as "trigger cam plate 72" in U.S. Pat. No. 4,167,844 to J. H. Freimuth et al. Likewise, bracket B is designated as "side bracket 77" and shaft S is designated as "shaft 80" in the Freimuth et al patent. Engagement of the finger angled portion 84*b* with the bracket B causes counterclockwise rotation of the plate P in FIG. 5 about the shaft S. This counterclockwise rotation of the plate P activates a twine wrapper (not shown) as described in the Freimuth et al patent. The parts designated as "roller arm 51" and "roller bearing 54" in the Freimuth et al patent are replaced by the sliding member 74 and finger 84, respectively, of the present invention.

Figure 2:
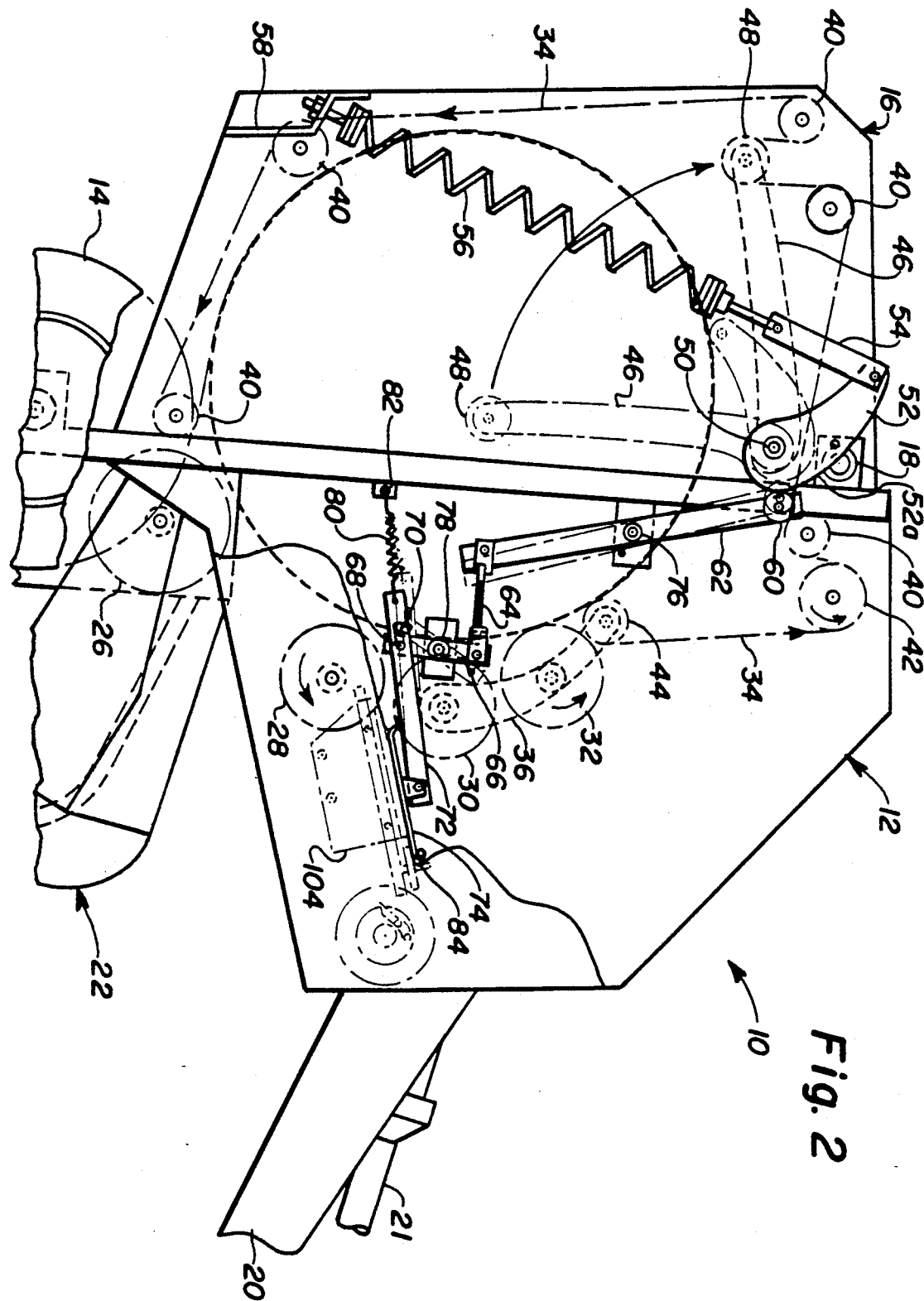
FIG. 2 is an enlarged side elevation view of the round baler of FIG. 1 taken near the end of bale formation.

At the start of bale formation, the round baler 10 will be in the condition illustrated in FIG. 1 with the apron take up arms 46 in their bale starting position shown in broken lines and the cam surface 52*a* on lever 52 contacting the cam roller 60. The links 62, 64, 66, 72 and the sliding member 74 are urged into the positions shown in FIG. 1 by the spring 80. During bale formation, the apron take up arms 46 move upwardly away from their bale starting position as the inner run of the apron 34 extending between the lowermost roller 40 and the drive roller 42 expands in length. This upward movement of the apron take up arms 46 causes rotation of the cam surface 52*a* which remains in contact with the cam roller 60 thereby resulting in rotation of the link 62 in a clockwise direction in FIGS. 1 and 2. When the apron take up arms 46 reach a full bale position, the links 62, 64, 66, 72 and the sliding member 74 are moved into the tripping positions shown in full lines in FIG. 2 and the finger 84 on the sliding member 74 engages the bracket B on plate P and automatically trips the twine wrapper (not shown) into operation. Since the length of the second link 64 is adjustable, the tripping position of the sliding member 74 may be adjusted as desired.

Figure 3:
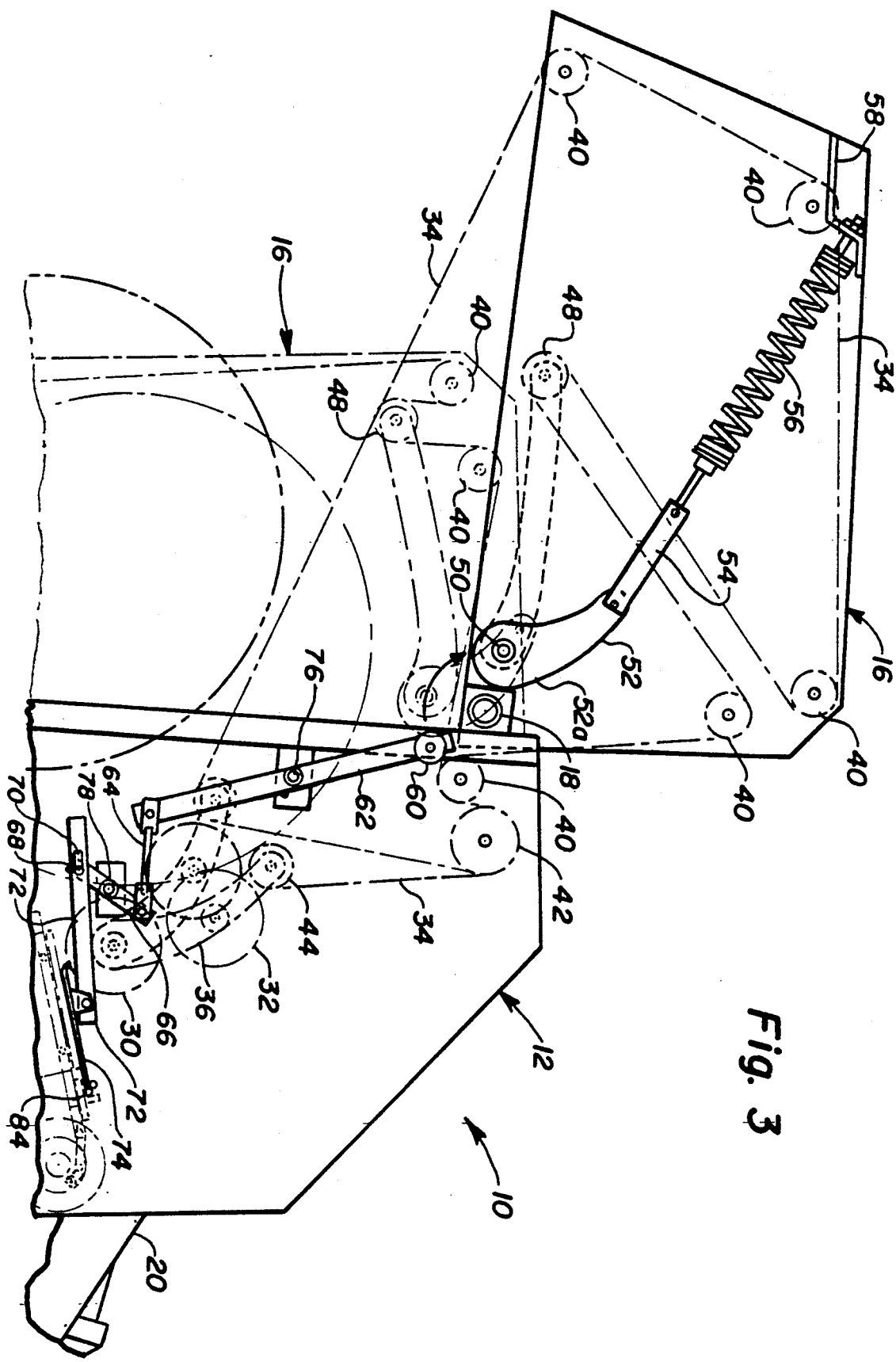
FIG. 3 is an enlarged side elevation view of a portion of the round baler of FIG. 1 taken as a completed bale is being discharged.

Once a bale has been wrapped with twine, the tailgate 16 is raised as illustrated in FIG. 3 and the wrapped bale is discharged from the round baler 10. As the tailgate 16 is raised, the cam surface 52*a* on lever 52 is moved out of engagement with the cam roller 60 on link 62. This prevents the finger 84 on sliding member 74 from being moved into engagement with the bracket B on plate P. Therefore, the twine wrapper will not be improperly tripped into operation by the sliding member 74 when the tailgate 16 is raised.

What is claimed is:

1. In a roll baling machine having a main frame, a tailgate pivotally connected to said main frame, an apron extending around a plurality of guide members disposed in said main frame and said tailgate, a pair of take up arms rotatably mounted in said tailgate and carrying a further guide member around which said apron extends, said take up arms having a bale starting position, a lever connected to rotate with said take up arms, spring means connected to said lever for urging said take up arms into said bale starting position, a mechanism for automatically tripping a twine wrapper into operation comprising:

a cam surface on said lever engageable with a cam roller carried on a first link, said first link being rotatably mounted on said main frame and connected to a sliding member which is movable toward and away from a tripping position for automatically tripping said twine wrapper into operation.

2. The tripping mechanism of claim 1, further comprising second, third, and fourth links connecting said first link to said sliding member.

3. The tripping mechanism of claim 2, wherein said second link is adjustable in length, and wherein said third link carries a pin engaged in a slot formed in said fourth link.

4. The tripping mechanism of claim 3, further comprising a tension spring connected between said fourth link and said main frame for urging said sliding member away from said tripping position.

5. The tripping mechanism of claim 4, wherein said first and third links are rotatably mounted on shafts on said main frame.

6. The tripping mechanism of claim 1, wherein said sliding member comprises a base with a finger at one end and a hook adjacent the other end thereof.

7. The tripping mechanism of claim 6, wherein said finger has a straight portion and an angled portion extending rearwardly and upwardly with respect to said straight portion.

8. The tripping mechanism of claim 7, wherein said hook has a lower leg extending underneath a flange portion of a support bracket on said main frame in order to guide the movement of said sliding member toward and away from said tripping position.

9. The tripping mechanism of claim 8, further comprising an elongated slot in said base of said sliding member for receiving stop means attached to said support bracket in order to limit the movement of said sliding member toward and away from said tripping position.

10. The tripping mechanism of claim 9, wherein said stop means comprises a sleeve through which a bolt extends, said bolt being fastened to said support bracket.

11. A roll baling machine comprising:

a main frame;
 a tailgate pivotally connected to said main frame;
 an apron extending around a plurality of guide members disposed in said main frame and said tailgate;
 a pair of take up arms rotatably mounted on said tailgate and carrying a further guide member around which said apron extends, said take up arms having a bale starting position;
 a lever connected to rotate with said take up arms;
 spring means connected to said lever for urging said take up arms into said bale starting position;
 said lever having a cam surface thereon engageable with a cam roller carried on a first link; and
 said first link being rotatably mounted on said main frame and connected to a sliding member which is movable toward and away from a tripping position for automatically tripping a twine wrapper into operation.

12. The roll baling machine of claim 11, further comprising second, third and fourth links connecting said first link to said sliding member.

* * * * *